United States Patent [19]

Ohira et al.

[11] Patent Number: 5,748,607
[45] Date of Patent: May 5, 1998

[54] OPTICAL DISC HAVING LARGE DISPLAY PATTERNS AND ITS MANUFACTURING APPARATUS

[75] Inventors: Hiroyuki Ohira; Nobuki Yamaoka; Yutaka Murakami, all of Yamanashi, Japan

[73] Assignees: Pioneer Video Corporation, Yamanashi; Pioneer Electronic Corporation, Tokyo, both of Japan

[21] Appl. No.: 575,080

[22] Filed: Dec. 19, 1995

[30] Foreign Application Priority Data

Jan. 12, 1995 [JP] Japan .................. 7-003363

[51] Int. Cl.⁶ .................. G11B 7/24; G11B 3/70
[52] U.S. Cl. .................. 369/275.4; 369/274
[58] Field of Search .................. 369/275.4, 275.1, 369/277, 280, 282, 273, 274

[56] References Cited

U.S. PATENT DOCUMENTS

| 3,689,078 | 9/1972 | Ban | 369/273 |
|---|---|---|---|
| 4,967,286 | 10/1990 | Nomula et al. | 358/342 |
| 5,398,231 | 3/1995 | Shin et al. | 369/275.4 |
| 5,608,717 | 3/1997 | Ito et al. | 369/275.3 |
| 5,608,718 | 3/1997 | Schiewe | 369/275.4 |

FOREIGN PATENT DOCUMENTS

| 514156 | 11/1992 | European Pat. Off. | 369/273 |
|---|---|---|---|
| 63-124284 | 5/1988 | Japan | 369/274 |
| 63-52389 | 5/1988 | Japan | 369/274 |
| 5668903 | 9/1991 | Japan | 369/274 |
| 5-797 | 1/1993 | Japan . | |

*Primary Examiner*—Tan Dinh
*Attorney, Agent, or Firm*—Morgan, Lewis & Bockius LLP

[57] ABSTRACT

An optical disk having both recording surfaces on which are formed pits trains. A recognizable display pattern is formed by a group of dummy pits formed on one of the recording surfaces. An apparatus for manufacturing the optical disk in which a light beam is modulated in accordance with a dummy forming signal obtained by selectively stopping a dummy pulse, and the modulated light beam is irradiated to a resist layer formed on a recording surface of a disk to form a group of dummy pits representing a display pattern.

8 Claims, 7 Drawing Sheets

OPTICAL DISC HAVING LARGE DISPLAY PATTERNS AND ITS MANUFACTURING APPARATUS

BACKGROUND OF THE INVENTION

1. Field of the Invention

The present invention relates to an optical disk and its manufacturing apparatus.

2. Description of the Related Background Art

Figure 1:
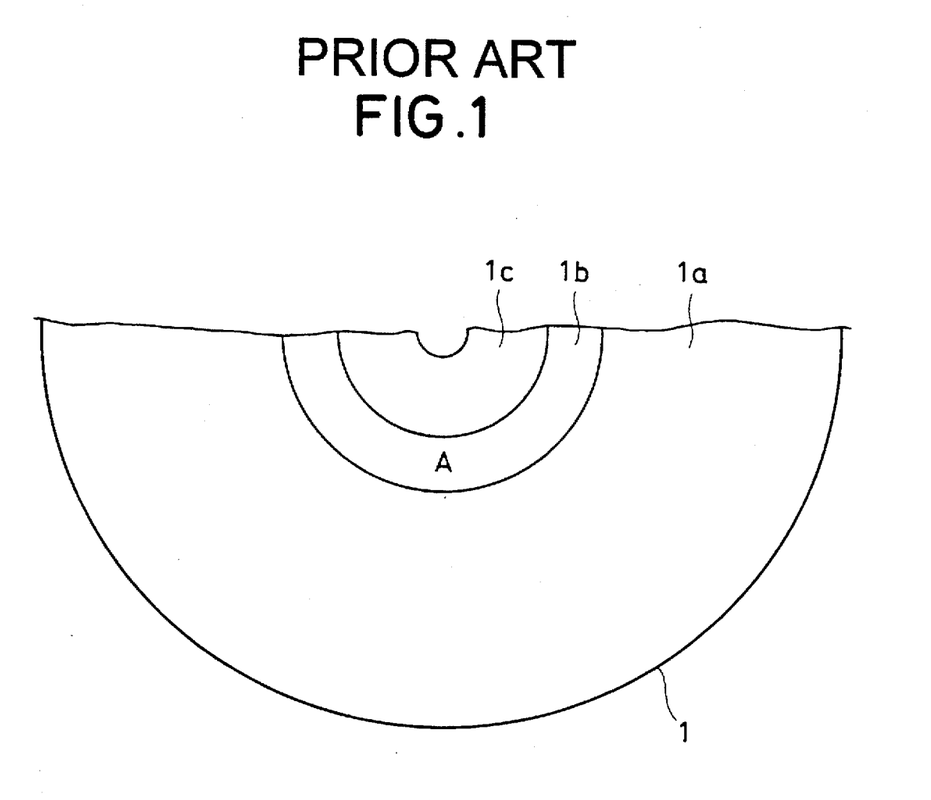
FIG. 1 is a schematic diagram of a conventional optical disk.

As a conventional optical disk, as shown in FIG. 1, an optical disk 1 in which a pattern such as a character "A" that can be recognized has been formed in an area 1b between an information recording area 1a and a label area 1c of the optical disk 1 is well-known in, for example, Japanese Patent Publication No. JP-5-797.

Since a display area of such a pattern is narrow, however, an enough large pattern cannot be displayed and its display information amount is also limited.

SUMMARY OF THE INVENTION

The present invention is, therefore, made in consideration of the above problems and it is object of the invention to provide an optical disk which can display a clear and large pattern such as a character and an apparatus for manufacturing the optical disk.

According to the present invention, there is provided an optical disk having both recording surfaces on which pit trains are formed, wherein one of the recording surfaces has concentrical or spiral recording tracks constructed by pit trains carrying information signals; and the other of the recording surfaces has a display pattern area different from an adjacent area in reflection diffraction characteristic by forming dummy pits in order to display a predetermined pattern.

In the optical disk according to the present invention, pit trains are formed on both recording surfaces on which, since a display pattern is formed by a group of dummy pits formed on one of the recording surfaces, a clear and enough large pattern such as a character or like can be displayed.

An apparatus for manufacturing an optical disk, comprising: a turntable which supports a disk having an unexposed photoresist layer on a recording surface and rotates the supported disk; a light source for emitting a light beam; rotation sync signal generating means for generating a rotation sync signal synchronized with a rotation of the turntable; dummy pulse generating means for repeatedly generating a dummy pulse for a dummy pit; stopping means for selectively stopping the dummy pulse to generate a dummy forming signal; modulation means for modulating the light beam accordance with the dummy forming signal to generate the modulated light beam; and irradiating means for irradiating said modulated light beam onto the recording surface to form a group of dummy pits.

In the optical disk manufacturing apparatus according to the invention, a dummy forming signal is generated by selectively stopping a dummy pulse from dummy pulse generation means, a light beam is modulated in accordance with the dummy forming signal, and the modulated beam is irradiated to the photoresist layer of the disk as a recording surface to form a group of dummy pits. A recognizable display pattern, therefore, can be easily obtained by the group of dummy pits on the recording surface of the disk.

DETAILED DESCRIPTION OF THE PREFERRED EMBODIMENTS

An embodiment of the invention will now be described hereinbelow with reference to the drawings.

Figure 2:
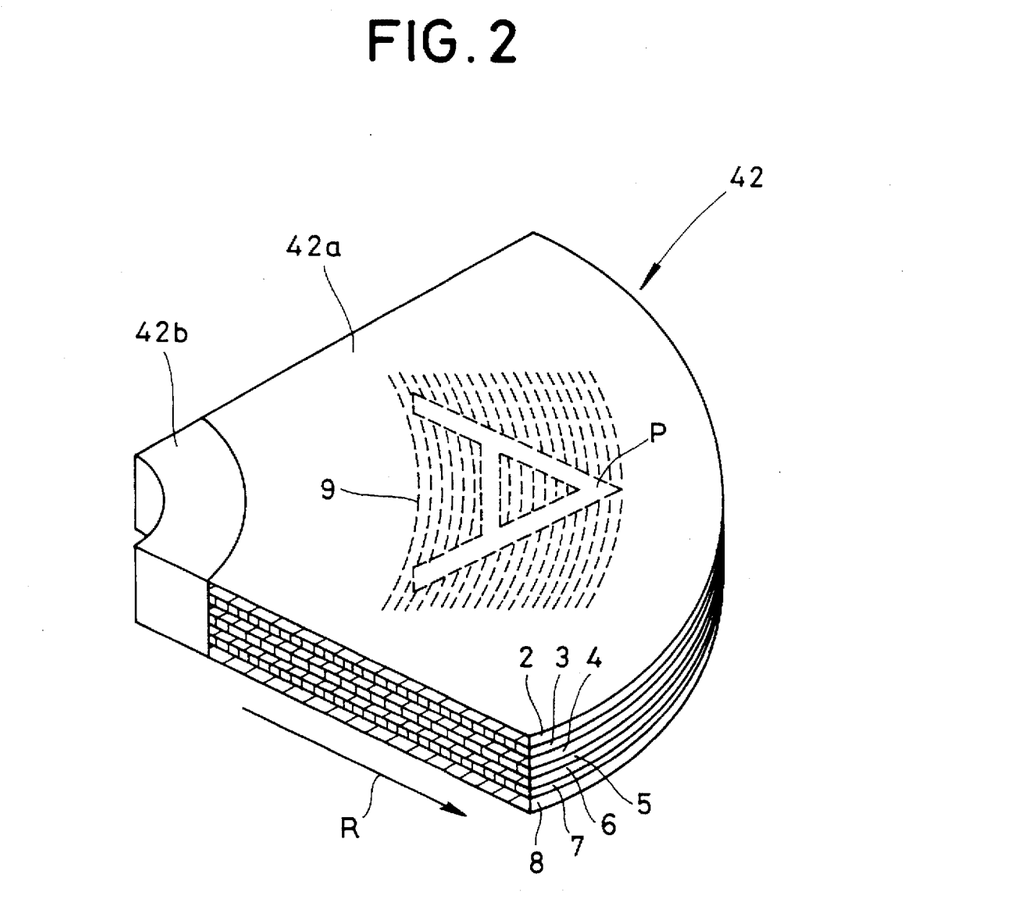
FIG. 2 is a perspective view showing a portion of an optical disk as an embodiment of the optical disk of the invention.
Figure 3:
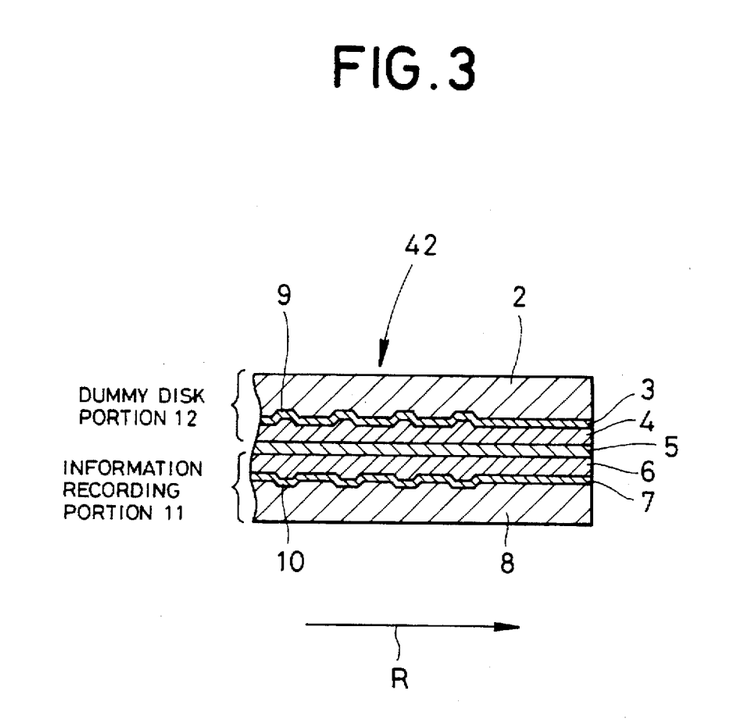
FIG. 3 is a sectional view of the optical disk in FIG. 2.
Figure 4:
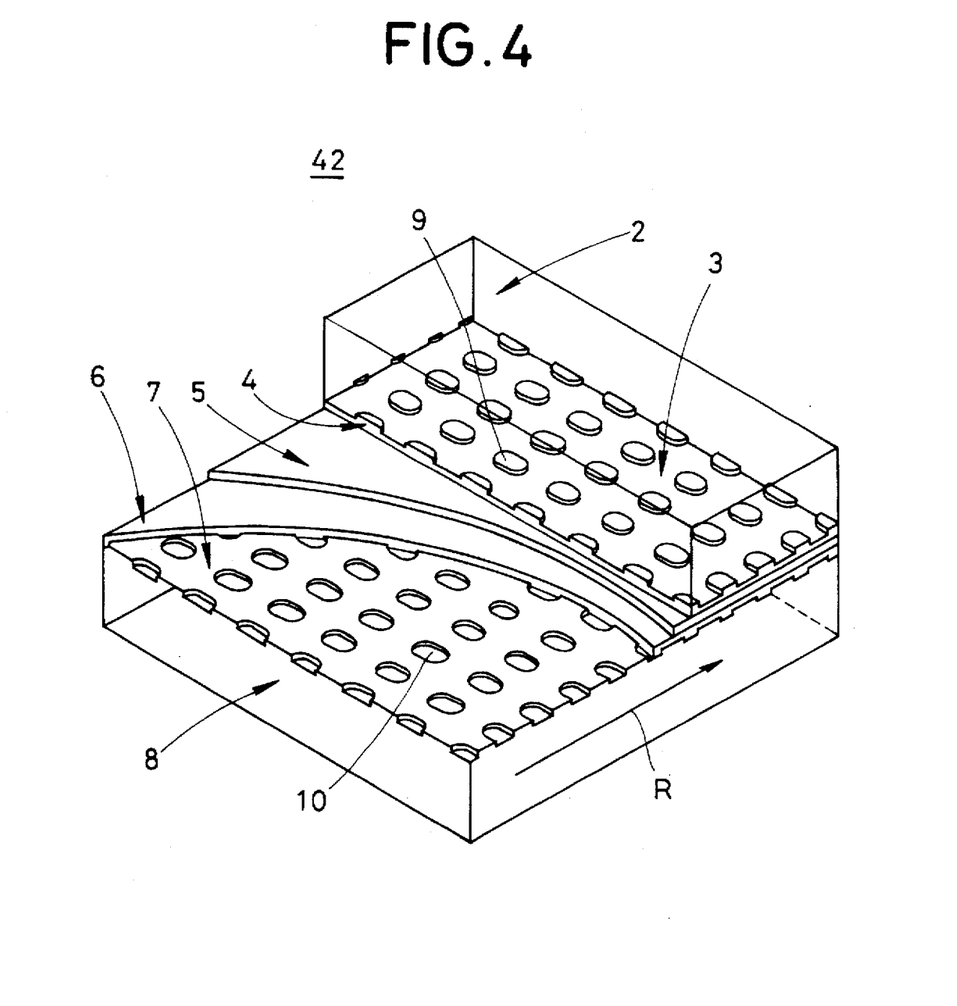
FIG. 4 is a perspective view three-dimensionally showing a section of the optical disk in FIG. 2.

FIGS. 2 to 4 show a structure of an optical disk according to the present invention. As shown in FIGS. 2 to 4, an optical disk 42 has a bit forming area 42a to be formed bits and a label area 42b on each side of it. The optical disk 42 is a so-called disk of a both side type in which an information recording disk portion 11 and a dummy disk portion 12 are coupled through an adhesive layer 5. An arrow R indicates a radial direction.

The information recording disk portion 11 is constructed by a substrate 8, a reflecting layer 7 and a protecting layer 6. A plurality of information pits 10 which form concentrical or spiral recording tracks carrying information signals are formed as pit trains on one side of the substrate 8. The reflecting layer 7 is formed on the pit-formed side of the substrate 8 and is covered with the protecting layer 6.

The dummy disk portion 12 is also constructed by a substrate 2, a reflecting layer 3 and a protecting layer 4. A plurality of pits, or dummy pits 9 which carry no information signal are formed as a group of pits on one side of the substrate 2. The reflecting layer 3 is formed on the pit-formed side of the substrate 2 and is covered with the protecting layer 4. The dummy pits are formed so as to generate bright rainbow colors by diffraction lights reflected from the reflecting layer 3.

The substrates 2 and 8 having circular form are the same size and are made of material such as transparent plastic. The reflecting layers 3 and 7 are made of metal. The optical disk 42 of the both side type is built by coupling the information recording disk portion 11 and dummy disk portion 12 with an adhesive layer 5 consisting of adhesive inserted between the protecting layers 4 and 6.

As will be obviously understood from the optical disk according to the invention shown in FIG. 2, in a pit forming area 42a of the substrate 2 in the dummy disk portion 12, a display pattern P representing a character "A" is formed by the group of dummy pits. The group of dummy pits is not in the display pattern P and is formed in portions around the display pattern P. Namely, the pattern P indicative of the character "A" is set to a blank portion to make a mirror face. It is possible to set the dummy pits to not only the surrounded portion but also a whole portion out of the pattern P.

In the recording side of the dummy disk portion 12, although lights reflected from the portion having the dummy pits 9 include diffraction light components, lights reflected from the mirror portions having no dummy pit do not include any diffraction light components. Therefore, the display pattern can be recognized in accordance with differences between the existence and no existence of the diffraction light component in the reflected lights.

In the above embodiment, the dummy pits are formed in the portions out of the display pattern P. However, the dummy pits can be formed only within the portion of the display pattern P.

If dummy pits are formed inside and outside of the display pattern P, the inside and outside dummy pits can be different from each other in depth or density. In this case, since the intensities or the diffraction angles of the reflected diffraction lights differ from each other inside and outside of the display pattern P, the display pattern P can be recognized.

Although the character "A" as the display pattern is displayed by using the group of dummy pits in the above embodiment, the display pattern is not limited. It is possible to display patterns such as graphics and pictures representing the contents of information signals recorded on the optical disk.

An embodiment of a optical disk manufacturing apparatus according to the present invention will now be described with reference to the drawings.

Figure 5:
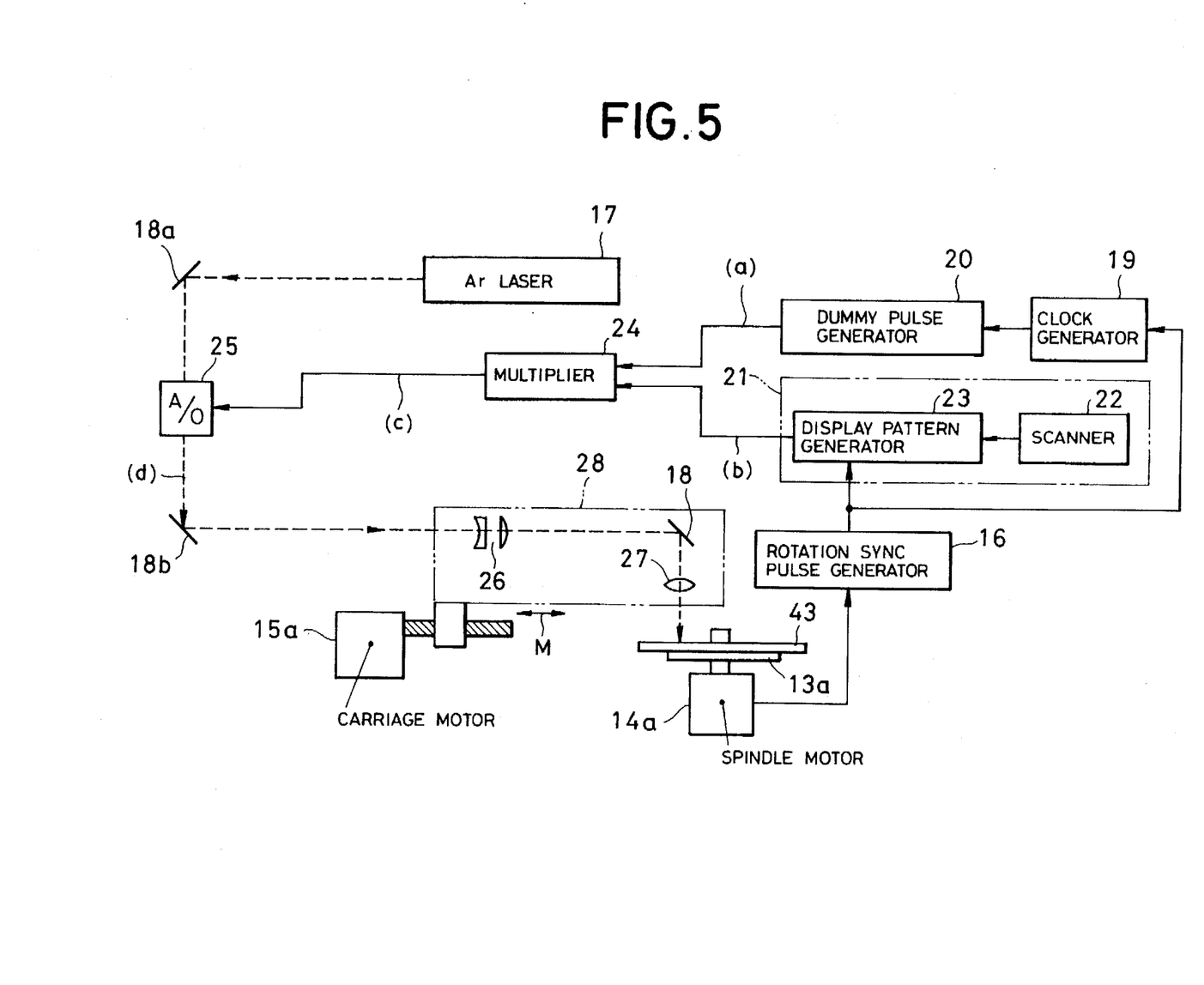
FIG. 5 is a schematic block diagram showing an embodiment of an apparatus for manufacturing the optical disk of the present invention.

FIG. 5 shows an embodiment of the apparatus for manufacturing a master disk for the above dummy disk portion 12 according to the invention. The manufacturing apparatus has the following construction.

As a light source for emitting a light beam, an Ar laser 17 is used. A dummy pulse generator 20 is used as dummy pulse generating means for repeatedly generating a dummy pulse to form a dummy pit. A multiplier 24 is provided as stopping means for selectively stopping the dummy pulse to generate a dummy forming signal. The dummy forming signal is generated by multiplying a display pattern signal generated from a display pattern generating circuit 21 by the dummy pulse in the multiplier 24.

The display pattern generating circuit 21 has a scanner 22 and a display pattern generator 23. The scanner optically reads a display pattern to form on the dummy disk portion 12 from a printed matter or a picture and then converts the read pattern into an electric signal which is supplied to the display pattern generator 23. The display pattern generator 23 generates a display pattern signal representing existence or no existence of the display pattern in response to a rotation sync pulse generated from a rotation sync pulse generator 16.

The display pattern generating circuit 21 can be constructed by a microcomputer in which a graphics pattern is made so as to generate the display pattern signal.

An A/O (Acoustic Optical) modulator 25 is used as modulation means.

A mirror 18b, a beam expander 26, a mirror 18c, and an objective lens 27 are used as irradiating means. An optical head 28 constructed by the beam expander 26, mirror 18, and objective lens 27 is driven in the directions shown by arrows M (optical disk radial direction) by a carriage motor 15a.

A turntable 13a supports a disk 43 having a positive type photoresist layer, which is exposed to form pits, on its surface. The turntable 13a is rotated by a spindle motor 14a.

The above rotation sync pulse generator 16 is used as rotation sync signal generating means for generating a rotation sync pulse synchronized with the rotation of the turntable 13a. A clock generator 19, further, generates a clock pulse in accordance with the rotation sync pulse.

The optical disk manufacturing apparatus performs the following recording operation.

A light beam generated from the Ar laser 17 is reflected by a mirror 18a to enter the A/O modulator 25.

On the other hand, a rotation sync pulse is generated in synchronism with the rotation of the turntable 13a from the rotation sync pulse generator 16. The clock generator 10 generates a clock pulse in response to the rotation sync pulse.

Figure 6A:
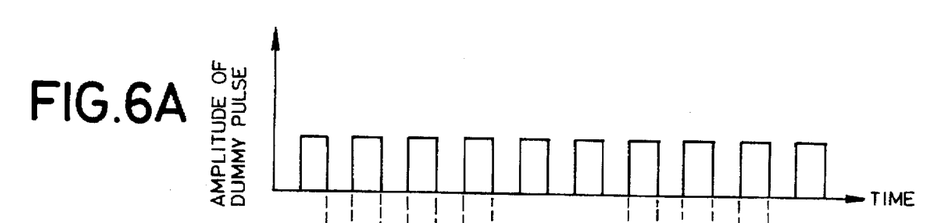
FIGS. 6A to 6E are diagrams showing examples of signal waveforms of respective portions in the apparatus of FIG. 5.
Figure 6B:
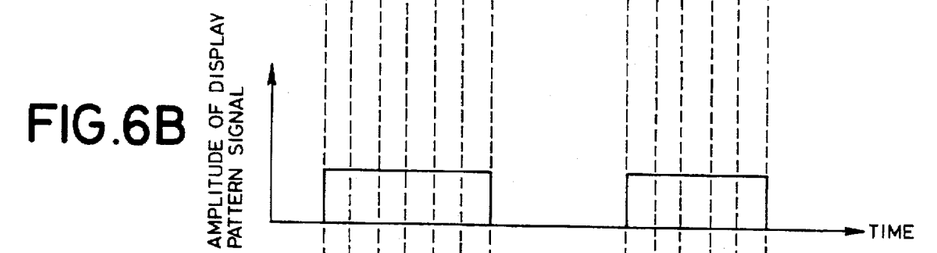
Figure 6C:
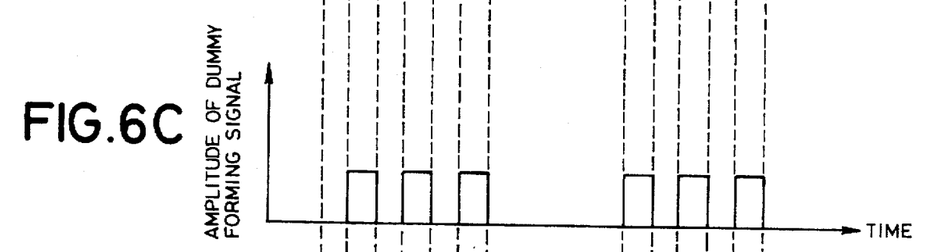

The dummy pulse generator 20 generates, for example, a dummy pulse having fixed pulse width as shown in FIG. 6A in synchronism with the clock pulse. A display pattern signal as shown in FIG. 6B generates from the display pattern generating circuit 21. The display pattern signal becomes a high level when a display pattern is read by the scanner 23. On the other hand, the display pattern signal becomes a low level when a display pattern is not read by the scanner 23. The multiplier 24 multiplies the display pattern signal by the dummy pulse in order to generate a dummy forming signal as shown in FIG. 6C.

Figure 6D:
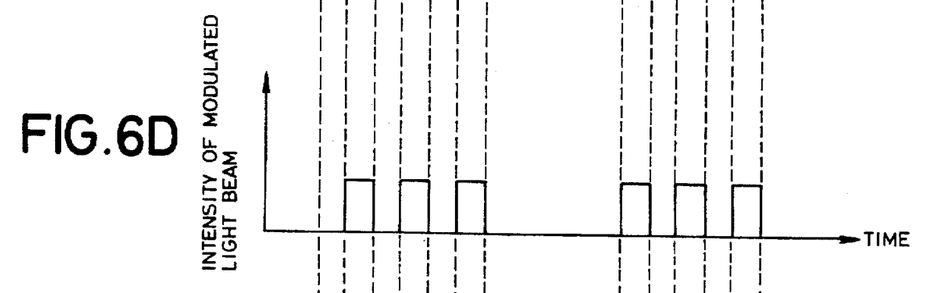

The A/O modulator 25 modulates the supplied light beam in accordance with the dummy forming signal, thereby generating a modulated light beam at an intensity as shown in FIG. 6D.

Figure 6E:
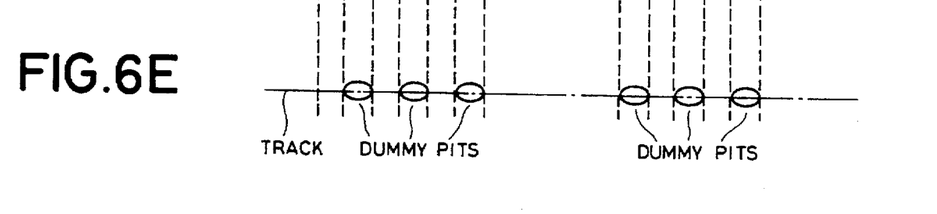

The modulated light beam is subsequently irradiated to the photoresist layer of the disk 43 through the mirror 18b, beam expander 26, mirror 18c, and objective lens 27, thereby forming trains of dummy pits on a track as shown in FIG. 6E.

The carriage motor 15a moves the optical head 28 in the directions of the arrows M so as to form the recording tracks having the dummy pit trains on the disk 43 at a predetermined pitch in accordance with the rotation of the disk 43.

The display pattern having no dummy pit is arranged on the disk 43 by the recording operation. The dummy pits 9 can be formed in portions out of the portion of the display pattern on the disk 43.

The depth and width of the dummy pit can be adjusted in accordance with the amplitude of the dummy pulse. The length of the dummy pit can be adjusted in accordance with the width of the dummy pulse.

According to the optical disk manufacturing apparatus comprising the above construction, the recognizable display pattern can be formed by forming the group of dummy pits.

In the embodiment, although the depths of the dummy pits are set to be constant, they can be also varied. If the depths of all the dummy pits are not constant, the intensities of diffraction lights obtained by reflection are not constant and bring light and shade different from that of the dummy pits having constant depth, to the display pattern.

If the display pattern signal shown in FIG. 6B is inverted in level, namely, becomes high level for the display pattern and becomes low level for no display pattern, the portion of dummy pits formed on the disk 43 can be recognized as a display pattern.

Further, in the embodiment, although the multiplier 24 is used as stop means for selectively stopping the dummy pulse generated from dummy pulse generating means in order to generate the dummy forming signal, it is not limited. Even if a gate circuit is used as the stop means, the same operation and advantage can be obtained. In this case, an input terminal of the gate circuit is supplied with the dummy pulse, a control terminal of the gate circuit is supplied with the display pattern signal, and the dummy forming signal is generated from an output terminal of the gate circuit.

It is well known that if replicas are obtained by using the disk 43 processed by the foregoing optical disk manufacturing apparatus as a master disk, a number of optical disks can be easily derived.

Figure 7:
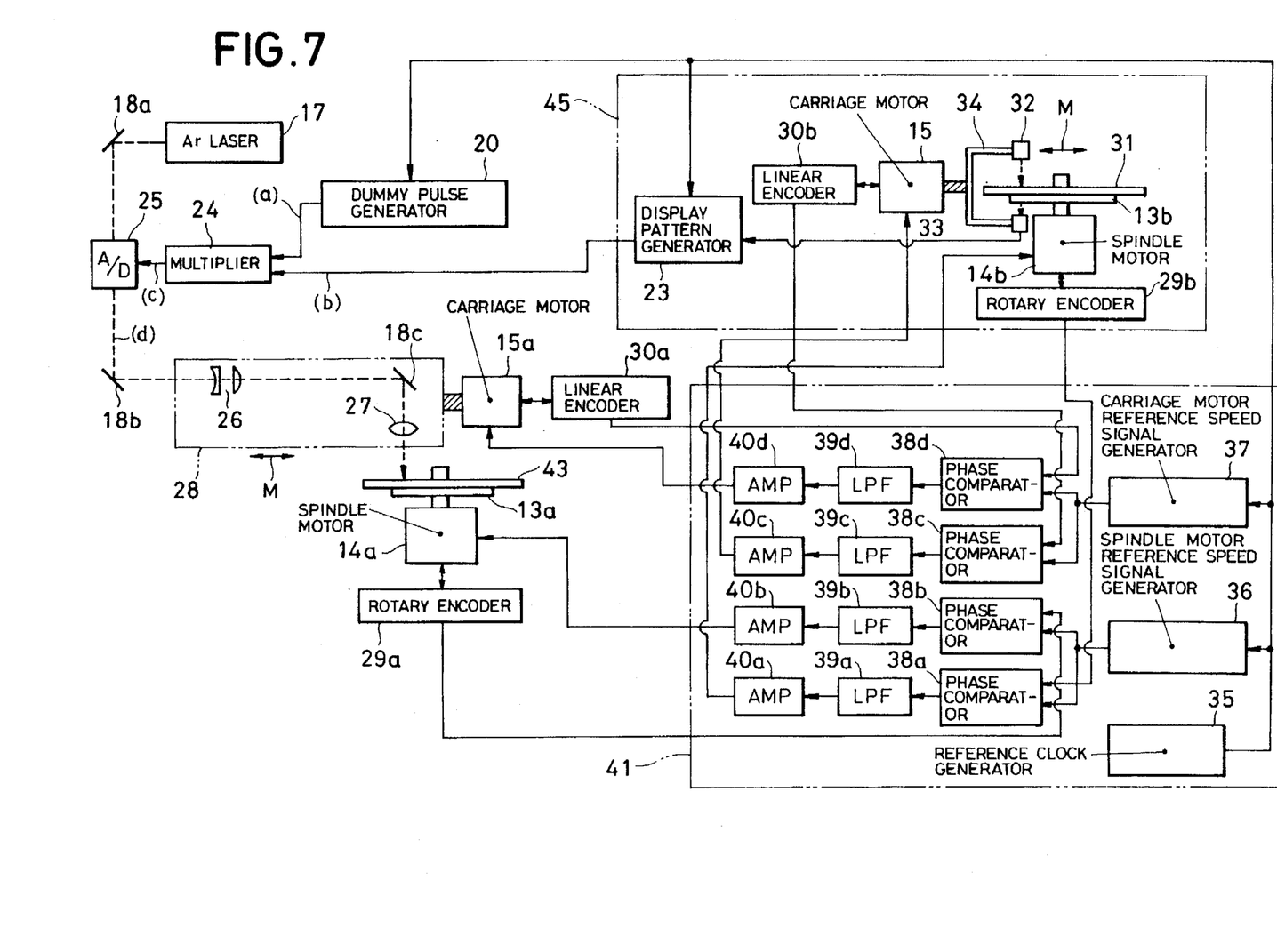
FIG. 7 is a schematic block diagram showing another embodiment of an apparatus for manufacturing the optical disk of the present invention.

FIG. 7 shows another embodiment of an apparatus for manufacturing the optical disk of the present invention. In FIG. 7, the portions similar to those in FIG. 5 are designated by the same reference numerals.

The Ar laser 17 as a light source, the dummy pulse generator 20 as dummy pulse generation means, the multiplier 24 as stopping means, the A/O modulator 25 as modulation means, and the portion consisting of the mirror 18b, beam expander 26, mirror 18c and objective lens 27 as irradiating means have the same construction as the manufacturing apparatus shown in FIG. 5.

In the present embodiment, a display pattern generating circuit 45 comprises a transparent disk 31 on which a display pattern is previously drawn, a turntable 13b for supporting the transparent disk 31, a spindle motor 14b for rotating the turntable 13b, a rotary encoder 29b for detecting a rotating speed and for generating a rotating speed signal representing the detected rotating speed, a light source 32 for emitting a light beam, a photo detector 33 for detecting a quantity of light passed through the transparent disk 31, a display pattern generator 23, a carriage 34 for supporting the light source 32 and photo detector 33, a carriage motor 15b for driving the carriage 34 in the disk radial direction, and a linear encoder 30b for detecting a carriage speed by the carriage motor 15b and for carriage speed signal representing the detected carriage speed.

A part of the light beam generated from the light source 32 passes through the transparent disk 31 having the display pattern. Quantity of light passed through the portion having no display pattern of disk 31 is larger than that of light passed through the portion having the display pattern. The photo detector 33 detects the quantity of the passed light which indicates whether or not the display pattern exists on the irradiated portion of the disk 31. The photo detector 33 generates an electric signal corresponding to the detected quantity of the light and supplies it to the display pattern generator 23. The display pattern generator 23 generates a display pattern signal as shown in FIG. 6B in response to a reference clock pulse generated from a reference clock generator 35 and supplies it to the multiplier 24.

A motor control signal generator 41 consists of PLL (Phase Locked Loop) circuit and controls rotating speeds of the spindle motors 14a and 14b and carriage speeds by the carriage motors 15a and 15b to keep constant speeds.

The rotary encoder 29b detects the rotating speed of the spindle motor 14a and then generates a rotating speed signal indicative of the detected rotating speed. A spindle motor reference speed signal generator 36 generates a spindle motor reference speed signal based on a reference clock pulse generated from the reference clock generator 35. A phase comparator 38b is supplied with the rotating speed signal and spindle motor reference speed signal, and compares the frequencies and phases of those signals to generates a signal representing the compared result. The signal of the compared result is supplied to the spindle motor 14a through an LPF (Low Pass Filter) 39b and an amplifier 40b.

Similarly, a rotating speed signal indicating the rotating speed of the spindle motor 14b generated from the rotary encoder 29b and a spindle motor reference speed signal generated from the spindle motor reference speed signal generator 36 are compared in frequency and phase in a phase comparator 38a. A signal obtained by comparing in the comparator 38a is supplied to the spindle motor 14b through an LPF 39a and an amplifier 40a. Thus, the rotating speeds of the spindle motors 14a and 14b are respectively controlled to hold content speeds.

A linear encoder 30a detects a carriage speed of the optical head 28 by the carriage motor 15a and generates a carriage speed signal indicative of the detected speed. A carriage motor reference speed signal generator 37 generates a carriage motor reference speed signal on the basis of a reference clock signal from the reference clock generator 35. A phase comparator 38d is supplied with the carriage speed signal and carriage motor reference speed signal, and compares the frequencies and phases of those signals to generates a signal representing the compared result. The signal of the compared result is supplied to the carriage motor 15a through an LPF 39d and an amplifier 40d.

Similarly, a carriage speed signal indicating a carriage speed by the carriage motor 15b generated from the linear encoder 30b and a carriage motor reference speed signal generated from the carriage motor reference speed signal generator 37 are compared in frequency and phase in a phase comparator 38c. A signal obtained by comparing in the comparator 38c is supplied to the carriage motor 15b through an LPF 39c and an amplifier 40c. Thus, the carriage speeds by the carriage motors 15a and 15b are respectively controlled to hold content speeds.

The recording operation is performed in a manner similar to the apparatus of FIG. 5 as follows:

A light beam generated from the Ar laser 17 is reflected by the mirror 18a and then enters the A/O modulator 25.

The dummy pulse generator 20 generates, for example, a dummy pulse as shown in FIG. 6A in synchronism with a reference clock signal from the reference clock generator 35. The display pattern generation circuit 45 generates, for example, a display pattern signal as shown in FIG. 6B in synchronism with the reference clock signal from the reference clock generator 35. The dummy pulse and display pattern signal are multiplied in the multiplier 24 to generate a dummy forming signal as shown in FIG. 6C.

In the A/O modulator 25, the supplied light beam is modulated in accordance with the dummy forming signal and the modulated light beam is generated in intensity as shown in FIG. 6D.

The modulated light beam is subsequently irradiated to the photoresist layer of the disk 43 through the mirror 18b, beam expander 26, mirror 18c, and objective lens 27, thereby forming trains of dummy pits on a track as shown in FIG. 6E.

As mentioned above, the spindle motors 14a and 14b, and carriage motors 15a and 15b are driven by the control signal output from the motor control signal generator 41. Thus, since the rotating speeds of the spindle motors 14a and 14b and the carriage speeds by the carriage motors 15a and 15b are respectively controlled to hold constant rotating and carriage speeds, the spot point of the light beam irradiated on the transparent disk 31 corresponds to that of the modulated light beam on disk 43.

According to the present invention as mentioned above, in the optical disk having both recording surfaces on which pit trains are formed, since a display pattern is formed by a group of dummy pits formed on one of the recording surfaces, a clear and enough large pattern such as a character or like can be displayed.

Further, in the apparatus for manufacturing the optical disk according to the present invention, a dummy forming signal is generated by selectively stopping a dummy pulse from dummy pulse generation means, a light beam is modulated in accordance with the dummy forming signal, and the modulated beam is irradiated to the photoresist layer of the disk as a recording surface to form a group of dummy pits. A recognizable display pattern, therefore, can be easily obtained by the group of dummy pits on the recording surface of the disk.

What is claimed is:

1. An optical disk having two recording surfaces on different sides of the disc on which pit trains are formed, wherein one of the recording surfaces has concentrical or spiral recording tracks formed by pit trains carrying information signals;

the other of the recording surfaces has a display pattern area different from an adjacent area in reflection diffraction characteristic by including dummy pits in order to display a predetermined pattern; and said display pattern area is formed by a mirror portion having no dummy pit.

2. An apparatus for manufacturing an optical disk, comprising:

a turntable which supports a disk having an unexposed photoresist layer on a recording surface and rotates the supported disk;

a light source for emitting a light beam;

rotation sync signal generating means for generating a rotation sync signal synchronized with a rotation of said turntable;

dummy pulse generating means for repeatedly generating a dummy pulse for a dummy pit;

stopping means for selectively stopping said dummy pulse to generate a dummy forming signal;

modulation means for modulating said light beam accordance with said dummy forming signal to generate the modulated light beam; and irradiating means for irradiating said modulated light beam onto said recording surface to form a group of dummy pits.

3. An apparatus according to claim 2, wherein said dummy pits are set to a constant pulse width.

4. An apparatus according to claim 2, wherein said dummy pits are formed outside of a display pattern area indicative of a predetermined pattern on said recording surface and said display pattern area is formed by a mirror portion having no dummy pit.

5. An apparatus according to claim 2, wherein said dummy pits are formed in a display pattern area indicative of a predetermined pattern and an adjacent area on said recording surface, and said display pattern area differs from said adjacent area in density of said dummy pits.

6. An optical disc comprising:

a first substrate having concentrical or spiral recording tracks formed by pit trains carrying information signals;

a second substrate having a display pattern area different from an adjacent area in reflection diffraction characteristic by including dummy pits in order to display a predetermined pattern; and an adhesive layer consisting of adhesive inserted between the first substrate and the second substrate, wherein the display pattern area is formed by a mirror portion having no dummy pits.

7. An optical disc according to claim 6, further comprising:

a first reflective layer being formed on a pit-formed side of the first substrate;

a first protective layer being formed between the first reflective layer and the adhesive layer;

a second reflective layer being formed on a pit-formed side of the second substrate; and a second protective layer being formed between the second reflective layer and the adhesive layer.

8. An optical disc according to claim 6, wherein the dummy pits carry no information signals.

* * * * *